(12) United States Patent
Potter et al.

(10) Patent No.: US 7,587,751 B2
(45) Date of Patent: Sep. 8, 2009

(54) METHOD AND APPARATUS FOR AUTOMATICALLY RE-VALIDATING MULTIPLE CLIENTS OF AN AUTHENTICATION SYSTEM

(75) Inventors: Darran Potter, Kent (GB); Jeremy Stieglitz, Menlo Park, CA (US); Andrew Clymer, Chippenha (GB)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 10/910,005

(22) Filed: Aug. 2, 2004

(65) Prior Publication Data
US 2006/0026670 A1 Feb. 2, 2006

(51) Int. Cl.
G06F 7/04 (2006.01)
(52) U.S. Cl. .................. 726/2; 726/3; 726/7; 713/151; 713/168; 709/225
(58) Field of Classification Search .............. 726/4, 726/2
See application file for complete search history.

(56) References Cited

U.S. PATENT DOCUMENTS

| 5,345,091 | A | * | 9/1994 | Craig et al. ............ 235/462.15 |
| 6,052,785 | A | * | 4/2000 | Lin et al. ..................... 726/5 |
| 7,080,404 | B2 | * | 7/2006 | Abdo et al. ................... 726/3 |
| 2003/0070087 | A1 | * | 4/2003 | Gryaznov ................... 713/201 |
| 2003/0140128 | A1 | * | 7/2003 | Cox et al. .................. 709/221 |
| 2004/0073793 | A1 | | 4/2004 | Takeda |
| 2004/0177252 | A1 | * | 9/2004 | Vallee et al. ................ 713/170 |
| 2005/0005005 | A1 | * | 1/2005 | Styles et al. ................ 709/223 |
| 2006/0015724 | A1 | * | 1/2006 | Naftali et al. ............... 713/168 |

OTHER PUBLICATIONS

Chiba et al, Dynamic Authorization Extensions to remote Authentication Dial In User Service (RADIUS), Jul. 2003, The Internet Society, Network Working Group, request for Comments 3576, pp. 5-6, 11, 14-16.*

(Continued)

*Primary Examiner*—Nasser G Moazzami
*Assistant Examiner*—Michael S McNally
(74) *Attorney, Agent, or Firm*—Hickman Palermo Truong & Becker LLP (57) ABSTRACT

According to one embodiment of the invention, a session list identifying communication sessions relating to supplicants that access a computer network through an access device is created and stored at an authentication server. Then, an event is received from an anti-virus system announcing an updated anti-virus policy. User input is received that requests performing posture validation for all the supplicants. Next, in response to the information received, a time value for starting the posture validation for a particular supplicant identified in the session list. Finally, in response to the information received, a request to perform posture validation is generated and sent to the access device, wherein the request includes supplicant identifying information, the time value, and instructions that instructs the access device to initiate the posture validation for that supplicant only after the time value has expired. The steps are repeated for all supplicants in the session list.

16 Claims, 6 Drawing Sheets

OTHER PUBLICATIONS

USPTO as International Searching Authority, Written Opinion of the International Searching Authority, Sep. 22, 2006, pp. 1-5, USPTO, Alexandria, Virginia.

Blunk, L. et al., "PPP Extensible Authentication Protocol (EAP)," Network Working Group, RFC 2284, Mar. 1998, 14 pages.

Chiba, M., et al., "Dynamic Authorization Extensions to Remote Authentication Dial In User Service (RADIUS)," Network Working Group, RFC 3576, Jul. 2003, 27 pages.

Cisco, "Cisco Trust Agent Administrator Guide: Chapter 1-Cisco Trust Agent Overview," Cisco Systems Inc., Text Part No. OL-6191-02, 2005, 4 pages.

* cited by examiner

METHOD AND APPARATUS FOR AUTOMATICALLY RE-VALIDATING MULTIPLE CLIENTS OF AN AUTHENTICATION SYSTEM

FIELD OF THE INVENTION

The present invention generally relates to data processing in the field of user authentication in networks. The invention relates more specifically to a method and apparatus for automatically re-validating multiple clients of an authentication system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Posture validation refers to a process of granting or denying access to a host that is seeking to access a computer network based on the state of the software installed and running on the host. For example, positive posture validation can occur when an access device, such as a router configured as an access server, determines that a computer seeking network access has a particular kind of anti-virus application, personal firewall, host-based intrusion protection applications, etc.

Steps involved in posture validation typically are performed by a network access device that permits or denies network access, and by an authentication server, which is responsible for obtaining and evaluating the security posture credentials from the network client, determining the overall system posture, and providing the appropriate network access policy to the access device based on the system posture. Optionally, a separate posture validation server application can support validation of the security posture credentials for a particular host application.

The authentication server typically also performs user authentication functions that require a client to prove its identity by offering a data credential that is verified in a secure manner by an authentication server. Some such servers also perform network access control and accounting functions and therefore are termed authentication, authorization and accounting (AAA) servers. A commercial example is Cisco-Secure Access Control Server, from Cisco Systems, Inc.

Wireless local area networks such as those that use the 802.1x protocol for wireless communications now commonly use some form of user authentication protocol. For example, Extensible Authentication Protocol (EAP), as defined in IETF RFC 2284, may be used. In EAP over LAN authentication, a wireless client device, such as a laptop computer, that is seeking to obtain network access is termed a supplicant. An AAA server provides user authentication services to an access device, typically a router, which intercepts requests of the supplicant; the access device has the role of a client with respect to the AAA server.

Existing methods of client posture validation allow an access device to mediate an EAP conversation between the supplicant and the authentication server to establish whether the supplicant conforms to required security standards. A supplicant that fails posture validation can attempt validation again at any time after user intervention occurs. For example, a user could install and configure anti-virus protection and then attempt posture validation. Further, an AAA server can force a supplicant to perform posture validation again ("re-validation") after a specified interval of time by delivering a session timeout message to the access device as part of a successful first validation response. Typically, the interval of time is about one day, to prevent an excessive use of AAA server resources, which could occur if numerous supplicants needed to re-validate too often.

All known approaches for re-validation involve individual requests to particular clients or supplicants. For example, RFC 3576 defines a Change of Authorization message, for the RADIUS protocol, which an AAA server may send to cause an access device to change authorization characteristics for a single supplicant. However, in certain scenarios, it is desirable to require a large number of clients to perform re-validation roughly concurrently; RFC 3576 does not describe a mass re-validation mechanism.

For example, assume that a large enterprise network contains 50,000 user machines managed by 100 access devices; an outbreak of a new virus occurs, and network policy changes to require all machines to have a minimum posture that can protect against the new virus. There is presently no mechanism to force a re-validation of all the user machines from a central point. Instead, in current practice, network administrators are required to contact each network access device and use command-line commands to purge user connections or request a re-validation of each user. During the time required to perform this approach, the new virus could cause extensive damage to resources in the network.

In one other known approach, an AAA server can send a "packet of death" (POD) to an access device that effectively instructs the access device to close a specified user session. Closing the session is a serious disadvantage for several reasons. First, user activities such as downloading a file or interacting with an application are interrupted and terminated, presenting a potentially major annoyance to the user. Second, when the POD approach is used for a large number of clients, the POD approach causes all the clients to attempt to re-establish access device sessions, which in turn causes the access device to attempt to re-authenticate all the clients to the AAA server. Consequently, the AAA server can experience an unreasonable short-term processing load. Further, not all access devices support POD.

Based on the foregoing, there is a clear need for an approach for forcing re-validation of a large number of clients or supplicants. It would be useful to have such a mechanism that is compatible with existing protocol infrastructure in general, and compatible with RADIUS and EAP in particular.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method is described for automatically re-validating multiple clients of an authentication system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Method of Automatically Re-validating Multiple Clients of an Authentication System
   2.1 Structural & Functional Overview
   2.2 Example Message Flow using Change of Authorization
3.0 Implementation Mechanisms—Hardware Overview
4.0 Extensions and Alternatives

1.0 General Overview

The needs identified in the foregoing Background, and other needs and objects that will become apparent for the following description, are achieved in the present invention, which comprises, in one aspect, a method of automatically re-validating multiple clients of an authentication system comprising creating and storing a session list identifying communication sessions relating to supplicants that access a computer network through an access device; receiving input requesting performing posture validation for all the supplicants; determining a time value for starting the posture validation for a particular supplicant identified in the session list; generating and sending to the access device, a request to perform posture validation, wherein the request comprises supplicant identifying information and the time value and instructs the access device to initiate the posture validation for that supplicant only after the time value has expired; and repeating the steps of determining, generating and sending for all supplicants in the session list.

According to one feature, the user input comprises a selection for mass posture re-validation by a network administrator using a network management application. In another feature, the user input comprises an event received from an anti-virus system, threat detection system, intrusion detection system, or other functional system.

In still another feature, the request to perform posture validation comprises a RADIUS Change of Authorization request message. In yet another feature, the request to perform posture validation comprises a RADIUS Change of Authorization request message with a Service Type value of Authorize-Only. Further, the request to perform posture validation may comprise a RADIUS Change of Authorization request message with a Service Type value of Authorize-Only, wherein the supplicant identifying information comprises a User-Identity attribute in the Change of Authorization request message, and the time value is encoded as an additional attribute in the Change of Authorization request message.

In yet another feature, the method further comprises steps performed at an access device, including initiating a timer for a time period equal to the time value; and initiating posture validation for the supplicant identified in the request to perform posture validation only after the timer has expired. In any of the foregoing features, posture validation may comprise any one or more of: receiving and evaluating machine certificates, machine identity information, software configuration or policy compliance information, machine or user governance information, or performing other user or machine credential checks.

In other aspects, the invention encompasses a computer apparatus and a computer-readable medium configured to carry out the foregoing steps.

2.0 Method of Automatically Re-Validating Multiple Clients of an Authentication System

2.1 Structural and Functional Overview

Figure 1A:
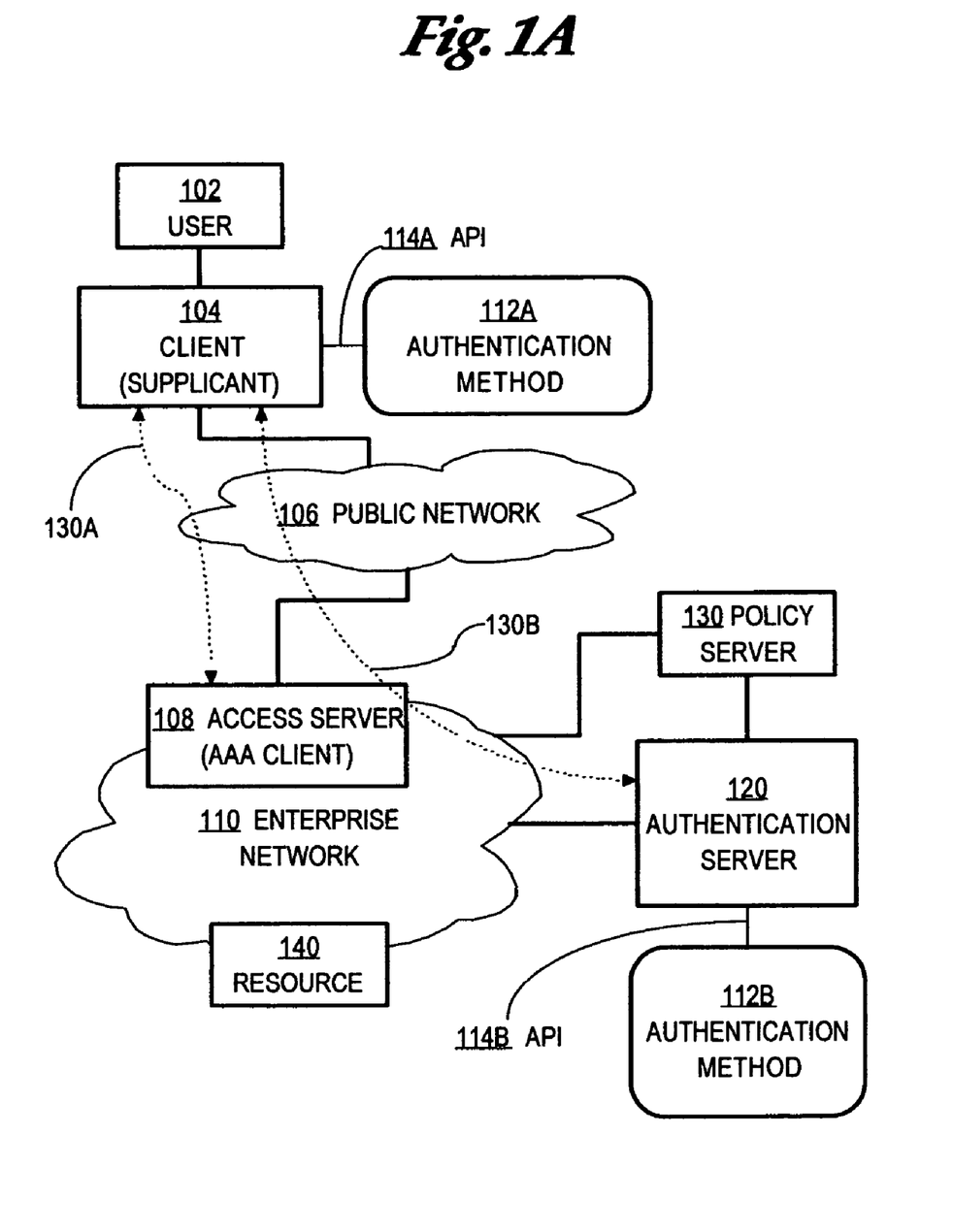
FIG. 1A is a block diagram that illustrates an example network arrangement in which an embodiment can be used.

FIG. 1A is a block diagram that illustrates an example network arrangement in which an embodiment can be used. A user 102 is associated with a client 104 that is communicatively coupled to a public network 106 and indirectly communicatively coupled to an enterprise network 110. In the terminology of the RFC that describes EAP, a client system is termed a "supplicant," and in this description client 104 is such a supplicant. Client 104 may execute, for example, the 802.1x supplicant available from Microsoft. An access server 108, or AAA client, controls access to enterprise network 110, in cooperation with authentication server 120. The access server 108 is termed an AAA client because authentication server 120 services authentication requests of the access server.

Client 104 is any network-compatible end station, such as a personal computer or workstation. Network 106 may be any local area network, wide area network, or one or more internetworks. Enterprise network 110 is any network, including a WLAN, that holds one or more network resources 140 that client 104 is seeking to access. In certain embodiments, networks 106, 110 may be the same; thus, FIG. 1 is intended to broadly encompass any network arrangement in which an untrusted client 104 is seeking access to a resource 140 that is held in a secure network.

Access server 108 is, in one embodiment, a network router that is configured to perform access control functions. An example is Cisco Access Server AS5300, commercially available from Cisco Systems, Inc., San Jose, Calif. The EAP-compliant embodiments described herein may be implemented using any EAP-capable platform, including switches, routers, network elements that support VPN, wireless gateways, firewalls, etc.

Authentication server 120 is a server-class computer that is configured to securely store user authentication information such as usernames and passwords, and to perform authentication protocols, algorithms, and supporting processes, such as one-time password (OTP) validation, encryption and decryption, message digest evaluation, etc. In one embodiment, authentication server 120 communicates with access server 108 using a secure protocol that is optimized for use in authentication. An example of a suitable protocol is RADIUS.

Authentication server 120 also may incorporate the elements of FIG. 2 that are described further in section 2.2 below.

Optionally a policy server 130 is communicatively coupled to network 110 and/or to authentication server 120, or is integrated with the authentication server. The policy server 130 provides a repository of authentication policies that the authentication server 120 may consult to determine how to interact with client 104. For example, policy server 130 may specify a minimum required authentication method that client 104 must be capable of using for authentication, a particular kind of credential that the client must present in addition to completing successful authentication, etc.

In this arrangement, client 104 must successfully authenticate itself to access server 108, in cooperation with authentication server 120, to gain access to resource 140. Any of several authentication protocols may be used to perform authentication. An example of a suitable authentication protocol is PEAP, which is an EAP-compliant protocol that is performed as part of establishing a PPP connection between client 104 and access server 108. In an object-oriented environment, logic that defines messages and actions performed as part of the authentication protocol can be structured as an authentication method 112A that client 104 accesses or calls using an application programming interface (API) 114A. A compatible authentication method 112B is callable by authentication server 120 using API 114B.

In general, under EAP, when client 104 attempts to access enterprise network 110, access server 108 contacts the client and requests identity information, which the client provides in a response. Thus, client 104 and access server 108 establish a logical connection 130A. Access server 108 then passes all subsequent messages involved in the authentication protocol, and issued by client 104, to authentication server 120, and forwards related messages directed from the authentication server to the client. Accordingly, client 104 and authentication server 120 effectively establish a logical connection 130B until the authentication protocol terminates. As a result, authentication server 120 can use authentication method 112B to determine its authentication behavior since it represents the logical endpoint of the authentication protocol conversation.

For purposes of illustrating a clear example, the following discussion of FIG. 1B, FIG. 2, and FIGS. 3A-3B reference communications among elements of FIG. 1A. However, FIG. 1A represents merely one example of a network arrangement, and the techniques described herein may be used in many other network arrangements.

Figure 1B:
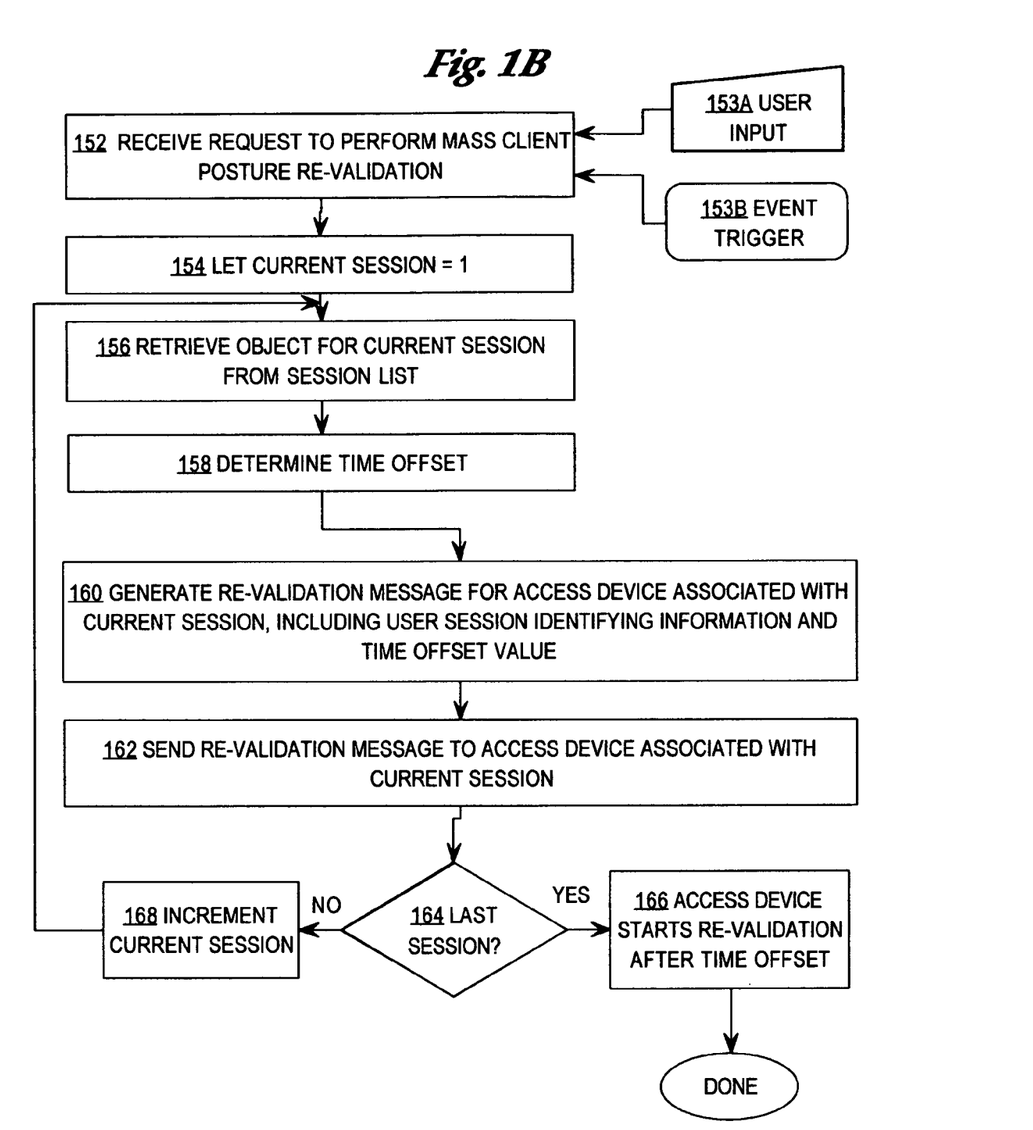
FIG. 1B is a flow diagram that shows an example method of automatically re-validating multiple clients of an authentication system.

FIG. 1B is a flow diagram that shows an example method of determining authentication capabilities. FIG. 1B depicts abstract steps that may be implemented, in one embodiment, in computer program instructions executed by authentication server 120.

In step 152, a request to perform mass client posture re-validation is received. The request may be received in the form of user input, as shown in block 153A. For example, the user input may comprise selecting a function button in the user interface of a network management application program. In such an embodiment, the techniques herein may be applied to provide "one-click" re-validation of a large number of supplicants or clients. Alternatively, the request may be received as part of an event 153B that is published by another process, application, or system. For example, an anti-virus system coupled to network 102 may detect a virus outbreak. In response, the anti-virus system publishes an event announcing an updated anti-virus policy. The event could identify the outbreak and requesting each authentication server in the network to re-validate all supplicants.

In step 154, a current session value is set to "1." In step 156, an object containing session data values for the current session is retrieved from a session list. In one embodiment, the session list is a session state table that is maintained by the authentication server 120.

Figure 2:
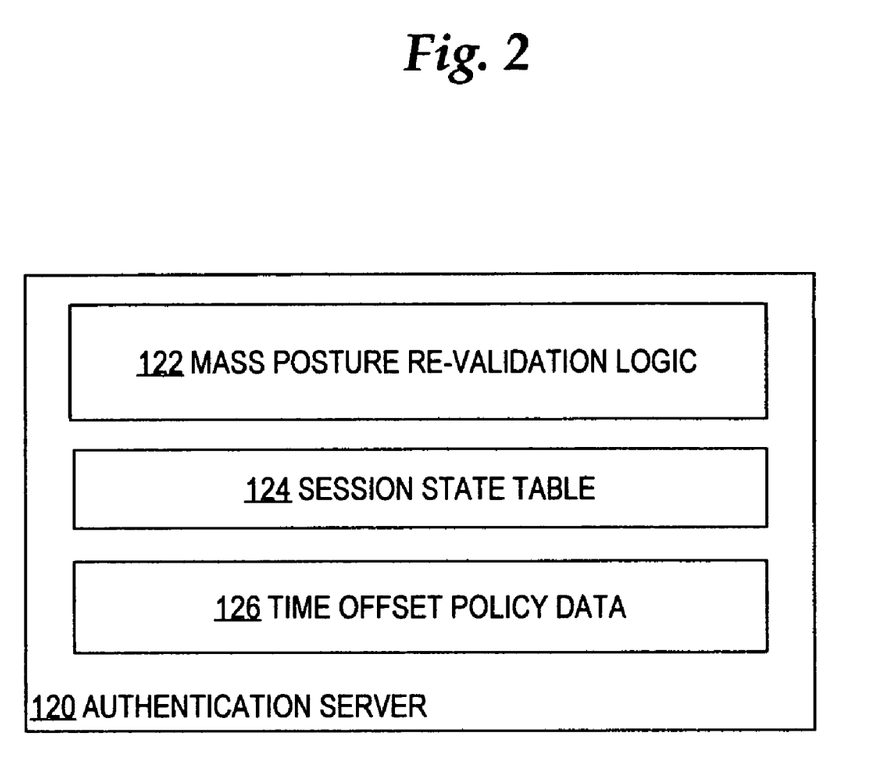
FIG. 2 is a block diagram of certain elements of an authentication server that may be used in an embodiment.

Referring now to FIG. 2, which is a block diagram of certain elements of an authentication server that may be used in an embodiment, the authentication server 120 of FIG. 1A may further comprise mass posture validation logic 122, session state table 124, and time offset policy data 126. Mass posture validation logic 122 comprises computer program instructions to implement the process of FIG. 1B or FIGS. 3A-3B as described further herein. Session state table 124 is a data structure that stores information identifying all users or client machines that are currently connected to an access device 108. In one embodiment, session state table 124 comprises, for each user session that is then currently active between a supplicant 104 and an access device 108, a client device IP address, client device port number (or, in WLAN deployments, other equivalent access point information), user ID value, a unique session ID value, and/or any other information necessary or appropriate for tracking sessions.

In one embodiment, session state table 124 identifies only sessions for supplicants that have authenticated using authentication server 120. Alternatively, in a network comprising multiple authentication servers, session state table 124 may store global session state data for all sessions that are active in any part of the managed network. Out-of-band data sharing techniques may be used to update the session state tables of multiple authentication servers.

Time offset policy data 126 is information indicating what re-validation time delay policy should be applied to sessions. The use of a time delay policy provides a mechanism for scheduling the re-validation of a large number of supplicants that are managed by a particular authentication server. Using a time delay policy is expected to help prevent a sudden influx of authentication requests, which may involve cryptographic computations or other functions that require extensive computing resources, from overloading the authentication server. The time delay policy causes an access device to re-validate a supplicant or client only after expiration of a specified time. This approach allows the authentication server 120 to send out a mass of re-validation messages as quickly as possible but schedule the resulting re-validation workload.

Accordingly, in step 158, a time offset value is determined. For example, step 158 involves retrieving the time offset policy data 126; determining which policy data applies to the supplicant identified in the current session object that was retrieved at step 156; and selecting a value in seconds representing a future scheduled time for re-validation. The time offset policy data 126 may provide for random assignment of schedule values or policy-driven time values. For example, priority status may be given to certain users, groups, or users of particular VLANs and so that they are scheduled to be re-validated first.

In certain network environments, using a time offset value may be unnecessary. Further, in an embodiment in which the authentication server and access device have system clocks that are approximately or exactly synchronized, step 158 may involve determining an absolute future time value, rather than an offset or delay value. In another alternative, step 158 may involve determining and assigning a sequence number, priority value or order value, rather than a time value.

In step 160, a re-validation message is generated for the access device associated with the current session, including user session identifying information and the time offset value that was determined at step 158. For example, step 160 involves creating a message from the authentication server 120 to access device 108, providing information identifying supplicant 104 and the time offset value, and instructing the access device to commence re-validation after expiration of the time offset value. A specific example message structure is described below in section 2.2. The particular structure of the message is not important. Any message may be used that (1) requests the access device to perform re-validation, (2) identifies the session or supplicant for which re-validation is needed, and (3) provides some form of scheduling information.

In step 162, the re-validation message is sent to the access device associated with the current session. Many networks use multiple access devices 108 for load balancing purposes. Therefore, the message that is created in step 160 is also assumed to contain information identifying the particular access device or sufficient to route the message to the correct access device.

In step 164, a test is performed to determine whether the current session is the last session identified in the session list. If not, then in step 168 the current session value is incremented, and control returns to step 156. Thus, steps 156, 158, 160, 162, 164, 168 represent iterating through the entire session list, creating a re-validation request message for each session, and sending the re-validation request message. In one embodiment, each iteration involves assigning a slightly different time offset value at step 158 so that subsequent authentication requests are reasonably scheduled or separated in time according to the processing capabilities of authentication server 120.

Steps 160-162 further involve creating a re-validation message that does not force closure of the then-current user or supplicant session with the access device. Consequently, resources are conserved by avoiding the overhead involved in recovering session resources and then re-allocating new resources when the user attempts to re-connect and re-validate.

If step 164 determines that the last session has been processed, then in step 166, the access device starts a re-validation after the first time offset value has expired. The particular operations undertaken by the access device to cause re-validation, and the steps involved in performing re-validation, are not pertinent to this disclosure and may be performed in conventional manner. An example process is described in the publication "Cisco Trust Agent Overview," from Cisco Systems, Inc., as part of the Cisco Network Admission Control solution.

2.2 Process and Message Flow

Figure 3A:
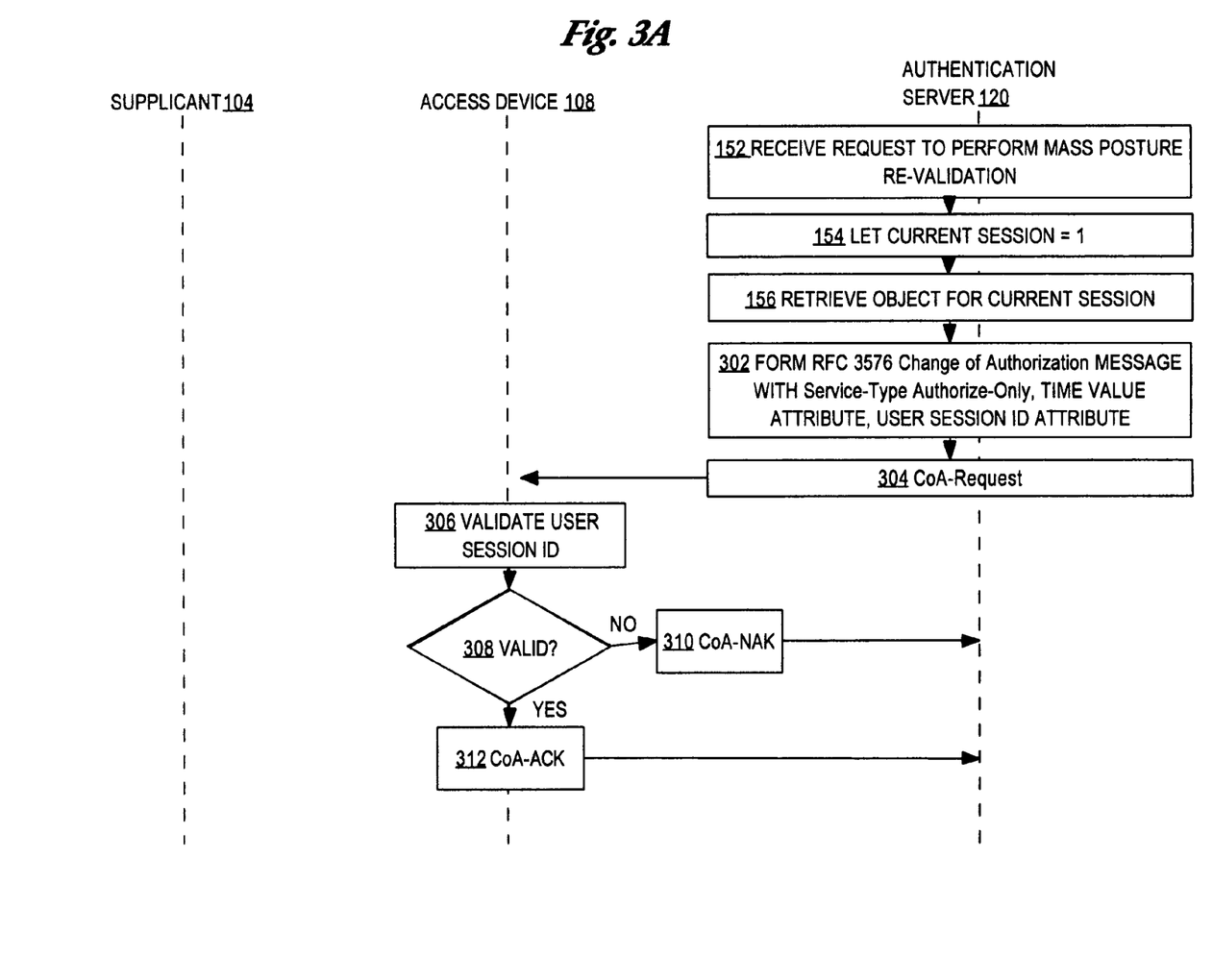
FIG. 3A is a message flow diagram that illustrates a second example method of automatically re-validating multiple clients of an authentication system.
Figure 3B:
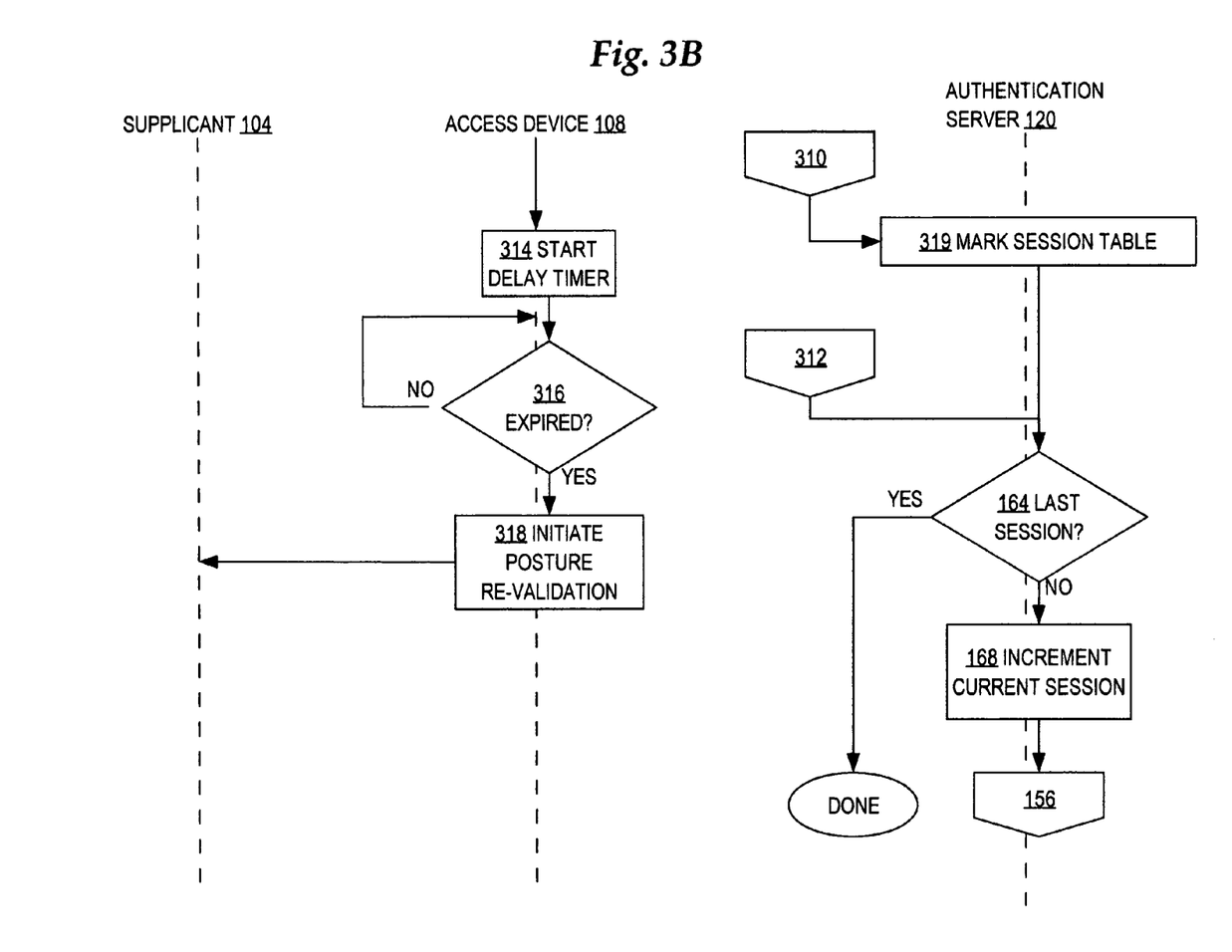
FIG. 3B is a flow diagram that illustrates further steps and messages in the method of FIG. 3A.

FIG. 3A is a message flow diagram that illustrates a second example method of automatically re-validating multiple clients of an authentication system; FIG. 3B is a flow diagram that illustrates further steps and messages in the method of FIG. 3A. Referring first to FIG. 3A, authentication server 120 performs steps 152, 154, 156 in the same manner as described above with respect to FIG. 1B. At step 302, authentication server 120 forms a Change of Authorization ("CoA") request message, using the general format defined in RFC 3576. Such a message has a RADIUS message type value of 43. The Service-Type value is set to Authorize-Only, and the time value (or order value or priority value) and user session information are encoded in additional attributes.

In one embodiment optimized for use with Cisco Network Admission Control (CNAC) components, the Cisco vendor-specific attribute (VSA) "service" may be included in the CoA Request in the form:
cisco-av-pair="aaa:
    service=IP.ADMISSION.REVALIDATE".

A VSA of this form expressly instructs a network access server that is compliant with CNAC to perform re-validation.

In step 304, the CoA Request is sent as a RADIUS protocol message to access device 108. In step 306, access device 108 validates the user session information contained in the CoA Request to verify that the access device is actually engaged in a user session matching the provided user session information. If the user session information is valid, as tested at step 308, then in step 312 the access device sends a CoA acknowledge message, of the form defined in RFC 3576, back to the authentication server.

If the user session information is invalid, then a non-acknowledge (NAK) message is sent back, as shown in step 310. The acknowledge and NAK messages may have the form defined in RFC 3576. Referring now to FIG. 3B, in response to receiving the NAK, authentication server 120 marks the session state table to indicate that the current session is invalid, as shown in step 319.

If a good acknowledgement was received, then steps 164, 168 are performed as described above for FIG. 1B. Concurrently, access device 108 starts a delay timer at step 314 for a time equal to the time value received in the CoA Request. When the timer expires, as shown by step 316 and step 318, access device initiates posture re-validation for the supplicant or session that is identified in the CoA Request.

In a network management system that is configured using the techniques disclosed herein, a network administrator can at the selection of a single button force every connected user to be re-validated, for example, upon detection of the start of a virus attack. In response, an AAA server iterates over its internal session list, sending re-validation RADIUS CoA messages to each access device associated with a session. The re-validation message includes attributes that instruct the access device to start a re-validation of the client. Therefore, embodiments provide centralized management of on-demand mass posture re-validation, including a method for scheduling or throttling the resulting re-validation processing loads. In particular, in embodiments that use a global session state table in each of a plurality of authentication servers, a single authentication server 120 can trigger re-validation of thousands of supplicants across the entire network, even if different authentication servers manage basic authentication processes for many of the supplicants. Moreover, the techniques herein do not require terminating existing user sessions as a pre-condition for re-validation. Further, the techniques require far less processing and overhead than the POD approach.

3.0 Implementation Mechanisms—Hardware Overview

Figure 4:
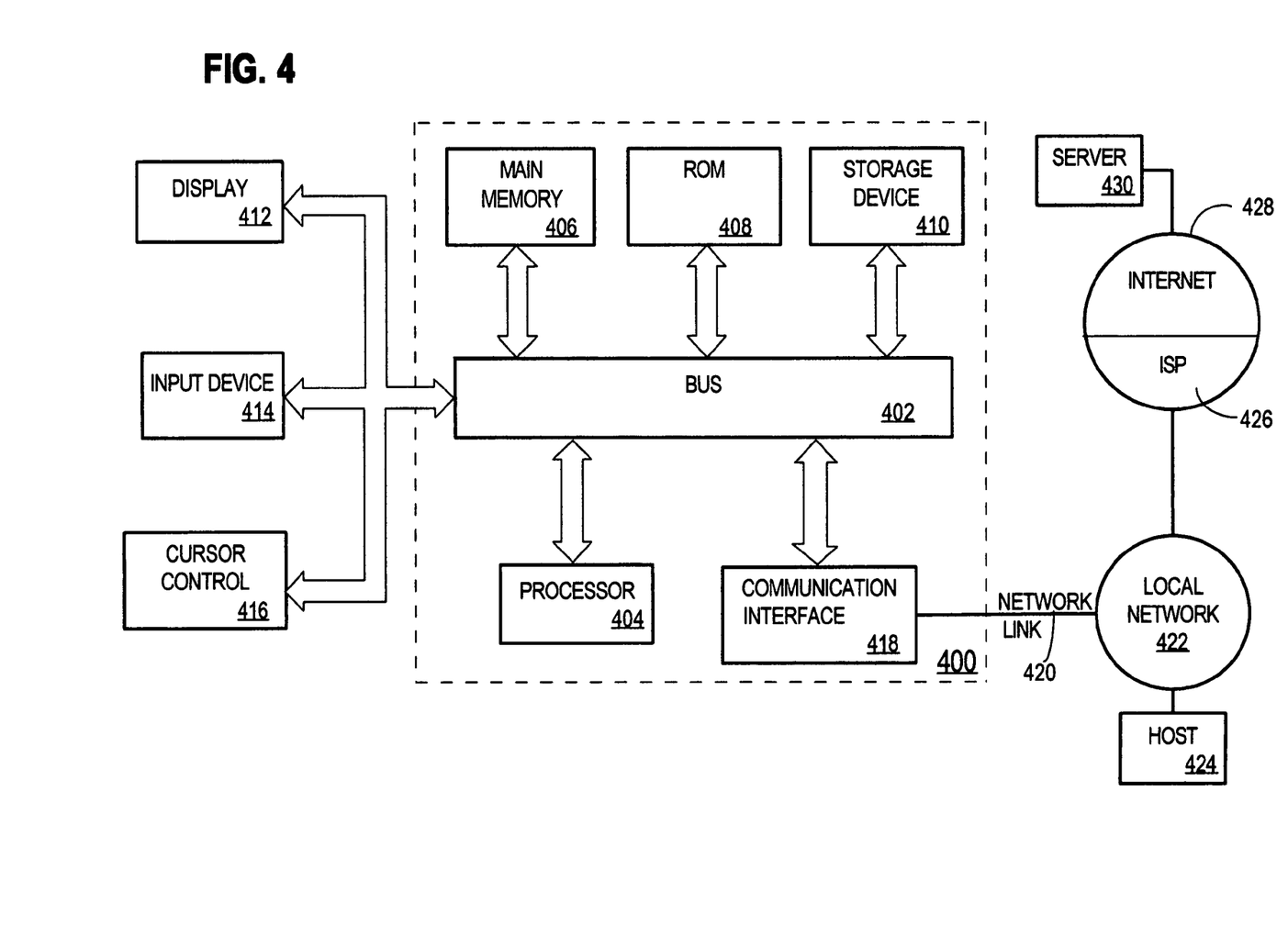
FIG. 4 is a block diagram that illustrates a computer system with which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing multiple authentication types within an authentication protocol that supports a single type. According to one embodiment of the invention, providing multiple authentication types within an authentication protocol that supports a single type is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for providing multiple authentication types within an authentication protocol that supports a single type as described herein.

Processor 404 may execute the received code as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:

creating and storing, at an authentication server, a session list identifying communication sessions relating to supplicants that access a computer network through an access device;

receiving a user input, at the authentication server, requesting performing posture validation for all the supplicants, wherein the user input comprises an event announcing an updated anti-virus policy that is received from an anti-virus system;

determining a priority for performing posture validation for a particular supplicant of a plurality of supplicants identified in the session list;

in response to the user input, determining a time value based on the priority for starting the posture validation for the particular supplicant identified in the session list,
wherein the step of determining the time value further comprises the steps of:
retrieving time policy data for performing posture validation; and
based on the time policy data, selecting a value of a future scheduled time for starting the posture validation for the particular supplicant;
in response to the user input, generating, at the authentication server, and sending to the access device, a request to perform posture validation,
wherein the request comprises supplicant identifying information, the time value, and instructions that instruct the access device to initiate the posture validation for that supplicant only after the time value has expired;
wherein the request to perform posture validation comprises a RADIUS Change of Authorization request message, and the time value is encoded as an additional attribute in the Change of Authorization request message; and
repeating the steps of determining, generating and sending for all supplicants in the session list.

2. A method as recited in claim 1, wherein the request to perform posture validation comprises a RADIUS Change of Authorization request message with a Service Type value of Authorize-Only.

3. A method as recited in claim 1, further comprising the steps, performed at an access device, of:
initiating a timer for a time period equal to the time value; and
initiating posture validation for the supplicant identified in the request to perform posture validation only after the timer has expired.

4. A method as recited in claim 1, wherein posture validation comprises any one or more of: receiving and evaluating machine certificates, machine identity information, software configuration or policy compliance information, machine or user governance information, or performing other user or machine credential checks.

5. An apparatus, comprising:
means for creating and storing, at an authentication server, a session list identifying communication sessions relating to supplicants that access a computer network through an access device;
means for receiving a user input, at the authentication server, requesting performing posture validation for all the supplicants, wherein the user input comprises an event announcing an updated anti-virus policy that is received from an anti-virus system;
means for determining a priority for performing posture validation for a particular supplicant of a plurality of supplicants identified in the session list;
means for determining a time value based on the priority for starting the posture validation for the particular supplicant identified in the session list in response to the user input,
wherein the means for determining the time value further comprises the steps of:
retrieving time policy data for performing posture validation; and
based on the time policy data, selecting a value of a future scheduled time for starting the posture validation for the particular supplicant;
means for generating, at the authentication server, and sending to the access device, a request to perform posture validation, in response to the user input,
wherein the request comprises supplicant identifying information, the time value, and instructions that instruct the access device to initiate the posture validation for that supplicant only after the time value has expired;
wherein the request to perform posture validation comprises a RADIUS Change of Authorization request message, and the time value is encoded as an additional attribute in the Change of Authorization request message; and
means for repeating the steps of determining, generating and sending for all supplicants in the session list.

6. The apparatus as recited in claim 5, wherein the request to perform posture validation comprises a RADIUS Change of Authorization request message with a Service Type value of Authorize-Only.

7. The apparatus as recited in claim 5, further comprising:
means for initiating, at an access device, a timer for a time period equal to the time value; and
means for initiating, at an access device, posture validation for the supplicant identified in the request to perform posture validation only after the timer has expired.

8. The apparatus as recited in claim 5, wherein posture validation comprises any one or more of: receiving and evaluating machine certificates, machine identity information, software configuration or policy compliance information, machine or user governance information, or performing other user or machine credential checks.

9. An apparatus for providing multiple authentication types within an authentication protocol that supports a single type of authentication for a client in communication with an authorization server over a network, comprising:
a network interface that is coupled to the data network for receiving one or more packet flows therefrom;
a processor;
one or more stored sequences of instructions which, when executed by the processor, cause the processor to carry out the steps of:
creating and storing, at an authentication server, a session list identifying communication sessions relating to supplicants that access a computer network through an access device;
receiving a user input, at the authentication server, requesting performing posture validation for all the supplicants, wherein the user input comprises an event announcing an updated anti-virus policy that is received from an anti-virus system;
determining a priority for performing posture validation for a particular supplicant of a plurality of supplicants identified in the session list;
in response to the user input, determining a time value based on the priority for starting the posture validation for the particular supplicant identified in the session list,
wherein the step of determining the time value further comprises the steps of:
retrieving time policy data for performing posture validation; and
based on the time policy data, selecting a value of a future scheduled time for starting the posture validation for the particular supplicant;
in response to the user input, generating, at the authentication server, and sending to the access device, a request to perform posture validation, wherein the request comprises supplicant identifying information, the time value, and instructions that instruct the access device to initiate the posture validation for that supplicant only after the time value has expired;

wherein the request to perform posture validation comprises a RADIUS Change of Authorization request message, and the time value is encoded as an additional attribute in the Change of Authorization request message; and repeating the steps of determining, generating and sending for all supplicants in the session list.

10. The apparatus as recited in claim 9, wherein the request to perform posture validation comprises a RADIUS Change of Authorization request message with a Service Type value of Authorize-Only.

11. The apparatus as recited in claim 9, which instructions further cause the processor to carry out the steps of:

initiating, at an access device, a timer for a time period equal to the time value; and initiating, at an access device, posture validation for the supplicant identified in the request to perform posture validation only after the timer has expired.

12. The apparatus as recited in claim 9, wherein posture validation comprises any one or more of: receiving and evaluating machine certificates, machine identity information, software configuration or policy compliance information, machine or user governance information, or performing other user or machine credential checks.

13. A computer-readable volatile or non-volatile medium carrying one or more sequences of instructions, which instructions, when executed by one or more processors, cause the one or more processors to carry out the steps of:

creating and storing, at an authentication server, a session list identifying communication sessions relating to supplicants that access a computer network through an access device;

receiving a user input, at the authentication server, requesting performing posture validation for all the supplicants, wherein the user input comprises an event announcing an updated anti-virus policy that is received from an anti-virus system;

determining a priority for performing posture validation for a particular supplicant of a plurality of supplicants identified in the session list;

in response to the user input, determining a time value based on the priority for starting the posture validation for the particular supplicant identified in the session list, wherein the step of determining the time value further comprises the steps of:

retrieving time policy data for performing posture validation; and based on the time policy data, selecting a value of a future scheduled time for starting the posture validation for the particular supplicant;

in response to the user input, generating, at the authentication server, and sending to the access device, a request to perform posture validation, wherein the request comprises supplicant identifying information, the time value, and instructions that instruct the access device to initiate the posture validation for that supplicant only after the time value has expired;

wherein the request to perform posture validation comprises a RADIUS Change of Authorization request message, and the time value is encoded as an additional attribute in the Change of Authorization request message; and repeating the steps of determining, generating and sending for all supplicants in the session list.

14. The computer-readable volatile or non-volatile medium as recited in claim 13, wherein the request to perform posture validation comprises a RADIUS Change of Authorization request message with a Service Type value of Authorize-Only.

15. The computer-readable volatile or non-volatile medium as recited in claim 13, further comprising the steps, performed at an access device, of:

initiating a timer for a time period equal to the time value; and initiating posture validation for the supplicant identified in the request to perform posture validation only after the timer has expired.

16. The computer-readable volatile or non-volatile medium as recited in claim 13, wherein posture validation comprises any one or more of: receiving and evaluating machine certificates, machine identity information, software configuration or policy compliance information, machine or user governance information, or performing other user or machine credential checks.

* * * * *